May 28, 1946.　　　A. MURRAY　　　2,401,264
SAW SET FOR BUCK SAW BLADES
Filed March 13, 1945　　　2 Sheets-Sheet 1
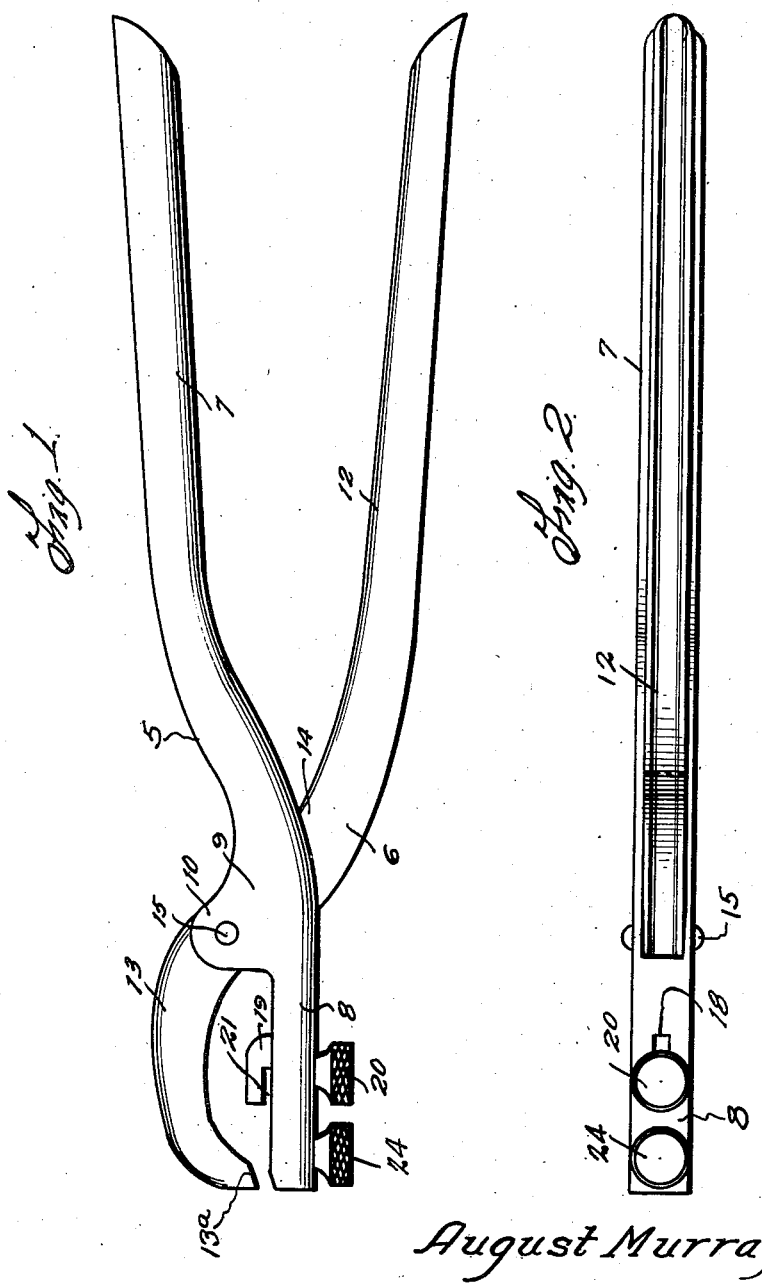
Inventor
August Murray.
By Clarence A. O'Brien
and Harvey B. Jacobson
Attorneys

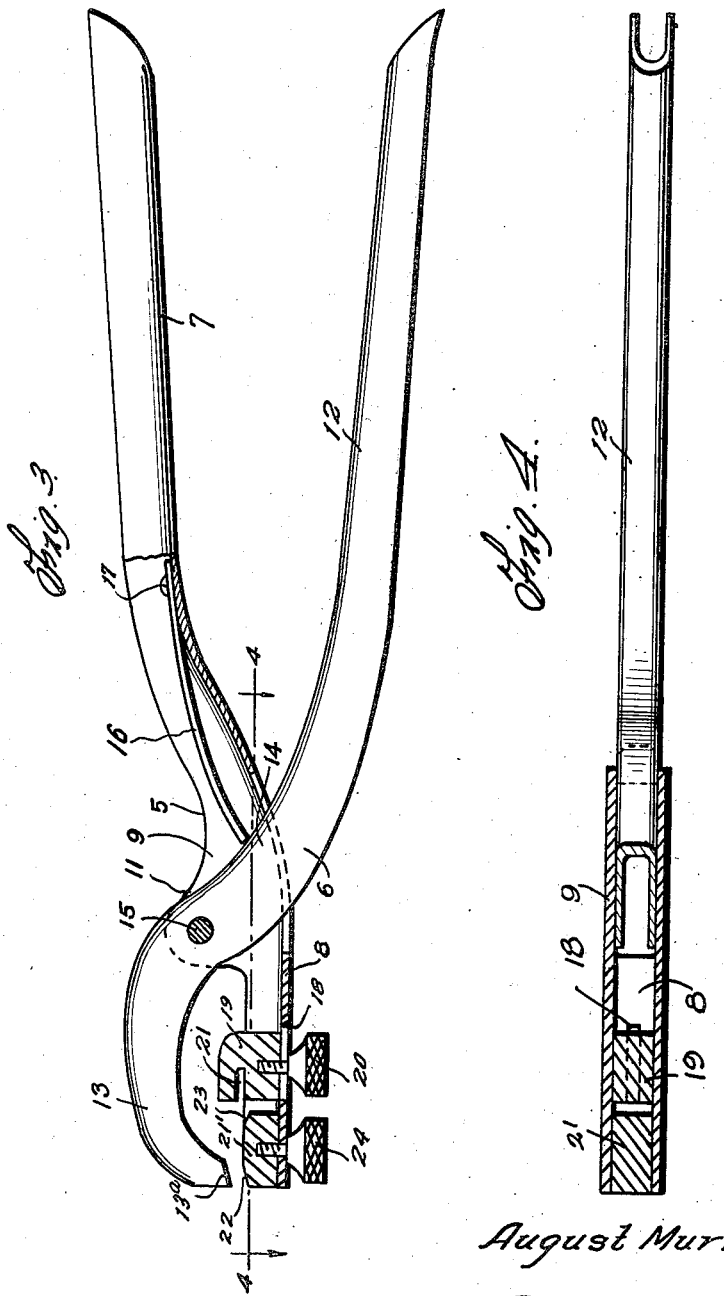

Patented May 28, 1946

2,401,264

UNITED STATES PATENT OFFICE 2,401,264

SAW SET FOR BUCKSAW BLADES

August Murray, La Branche, Mich.

Application March 13, 1945, Serial No. 582,483

1 Claim. (Cl. 76—64)

This invention relates to an improved saw set designed for use with buck saw blades, and one of its objects is to provide a saw set with a gauge for adjusting blades, and with a setting block or anvil, against which the teeth of the saw blade, when properly located by the gauge, can be set under pressure.

Another object of the invention is to combine a construction of this type in a two jaw lever hand tool, having a channel shaped jaw, in which the setting block or anvil is secured for adjustment, and the guage is adjustable, and another and companion jaw which can be forced by hand pressure against the saw tooth to bend it against the setting block or anvil, without breaking off the blade point.

With the above and other objects in view the invention relates to certain new and useful combinations, constructions, and arrangements of parts, clearly described in the following specification, and fully illustrated in the accompanying drawings, in which:

Fig. 1 is a side view in elevation of a hand tool embodying the features of this invention.

Fig. 2 is a bottom plan view thereof,

Fig. 3 is a side view of the device, partly in section, and

Fig. 4 is a longitudinal sectional view, taken substantially on the line 4—4 of Fig. 3, looking in the direction of the arrows, and showing one of the handles in plan.

Referring to the accompanying drawings, which illustrate one practical embodiment of my invention, 5 designates one of the levers and 6 the other lever. The lever 5 is provided with a longitudinal handle 7 and a channel shaped jaw 8, connected thereto by the curved intermediate portion 9, which is formed with opposing lugs 10 and 11. The lever 6 is provided with a longitudinal handle 12, and is connected with the jaw 13 by means of the curved portion 14. A rivet 15 extends through this curved portion and the opposed lugs 10 and 11. A spring 16, of flat stock curved into a slight bow effect, is secured at one end by the rivet 17 to the lever 5, so that the other end of the spring will bear against the outer edge of the lever 6 and thereby exert a pressure upon this lever to hold the jaw 8 of the lever 5 and the jaw 13 of the lever 6 normally spaced apart.

The channelled lever jaw 8 is formed with a longitudinal slot 18, and a gauge block 19 is slidable in the channel of the jaw over the slot 18. A large headed screw 20 is threaded through the slot 18 into the gauge block 19, to clamp the gauge block for sliding adjustment on the jaw 8. The gauge block is formed with a transverse slot 21 to receive the back edge of the buck saw blade.

Forwardly of the gauge block 19 a setting block or anvil 21' is disposed. This block or anvil is formed with two bevels 22 and 23, having different angular relation to one another and to the horizontal axis of the slot 21 of the gauge block. By detaching the setting block or anvil 21 from the jaw 8, by unscrewing the clamping screw 24, which is threaded through the jaw 8 into said block, the block may be reversed in the channel of the jaw 8, and either one of the bevels thereof used.

The forward end of the jaw 13 of the lever 6 is provided with a bevelled edge 13a which lies in confronting relation to the bevel of the setting block or anvil 21, which is disposed outermost on the jaw 8.

By pressure upon both handles of the two levers, by one hand of the user, the jaws 8 and 13 are forced together, and a buck saw blade disposed on the setting block and against the guage block, can be worked upon so that all of its teeth are set to the required degree. When the jaw 13 is forced against the saw teeth to be set the teeth will be bent against the bevel of the block 21, from the points of the teeth inwardly to their bases, so that a sharp bending strain will not be developed at the base of any tooth.

My improved saw set is carried by one hand and operated by it, and therefore, provides a tool of great simplicity and easy operation. No bench is required, and a workman can set a buck saw blade any place, whether in a shop or factory, or in the open field.

The construction is also of great simplicity, and permits the manufacture of a tool at low cost, which will give great service in use.

It is understood that various changes in the details of construction, combination and arrangement of parts, within the scope of the invention as defined by the claim, may be resorted to.

Having described my invention I claim as new:

A saw set comprising a pair of levers pivoted together intermediate their ends to provide opposed handles and opposed jaws, at least one of the jaws comprising a channel shaped body with its open side disposed toward the opposite jaw, a reversible anvil seated in the open side of the channel shaped body adjacent its free end, faces inclined at different angles at opposite ends of the anvil, an inclined face on the other jaw adapted to cooperate with the outermost inclined face on the anvil in setting the tooth of a saw and a gauge block adjustably mounted in the channel between the anvil and the pivoted point of the levers, said gauge block having a transversely extending saw blade receiving groove one wall of which lies in a plane with the outer surface of the anvil whereby a saw blade seated in the groove will be held in proper position with relation to the anvil during the setting of the teeth thereof.

AUGUST MURRAY.